J. Purkey,
Washing Machine,
Nº 15,895, Patented Oct. 14, 1856.
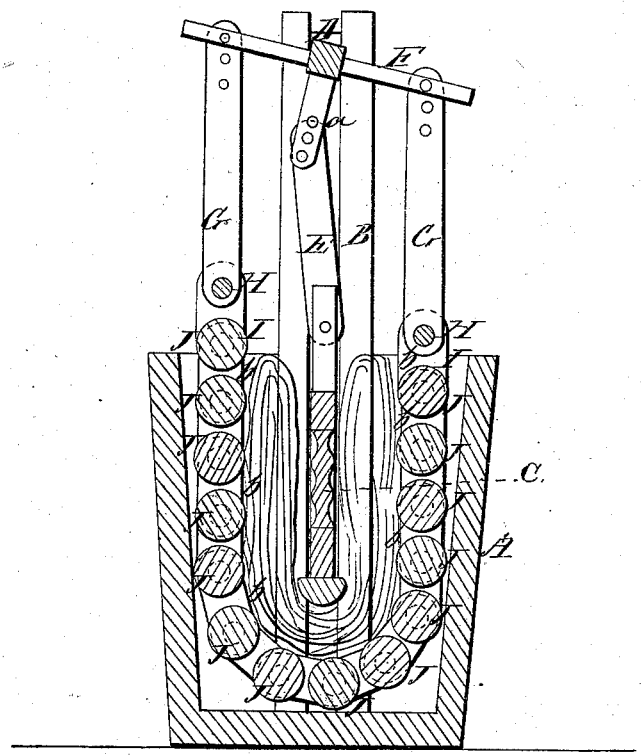

UNITED STATES PATENT OFFICE.

JACOB PURKEY, OF YORK, PENNSYLVANIA.

WASHING-MACHINE.

Specification of Letters Patent No. 15,895, dated October 14, 1856.

*To all whom it may concern:*

Be it known that I, JACOB PURKEY, of York, in the county of York and State of Pennsylvania, have invented a new and Improved Clothes-Washing Machine; and I do hereby declare that the following is a full, clear, and exact description of the same, reference being had to the annexed drawing, making a part of this specification, said drawing being a vertical section of my improvement, the plane of section being through the center.

My invention consists in the employment or use of a vertical reciprocating board, and a series of rollers attached to chains, the above parts being arranged and operating as will be hereinafter fully shown and described.

To enable those skilled in the art to fully understand and construct my invention, I will proceed to describe it.

A, represents a box the two sides of which may be slightly inclined; and B, B, represent two uprights which are attached to the inner surfaces of the end pieces of the box, said uprights being grooved vertically in their inner sides to receive a vertical board or rubber C, both sides of which are corrugated or fluted horizontally. The board or rubber C, is allowed to work freely up and down between the two uprights B.

D, represents a rock shaft the ends of which work in the upper ends of the uprights B, B. This rock shaft has a pendent (a), attached to it, and the upper end of a pitman E, is pivoted or jointed to it, the lower end of said pitman being pivoted or jointed to the upper end of the board or rubber C. Through each end of the rock shaft a bar F, passes. These bars have slots made through them near their outer ends and vertical bars G, are secured therein. Through the lower ends of the bars G, rods H, pass, and to each end of these rods, chains I, are attached. Each chain is attached to the two rods, the chains passing underneath the board or rubber C, as plainly shown in the drawing. Between the two chains I, I, rollers J, are secured, the journals or axes of the rollers fitting in the links (b), of the chains. The rollers J, as well as the board or rubber C, may be constructed of wood, and the chains I, I, may be constructed of either wood or metal.

The operation will be readily understood. The clothes to be washed, shown in red, are placed in the box A, between the board or rubber C, and the rollers J, the clothes being at each side of the board or rubber and the box supplied with a requisite quantity of suds. The ends of the bars F, are then grasped by the operator and worked up and down, and a reciprocating motion is communicated to the board or rubber C, and chains I, I, and rollers J, and the clothes are subjected to the necessary rubbing to cleanse them thoroughly from dirt, and without tearing them or breaking buttons which may be attached to them.

The device is extremely simple, it has been practically tested and has been found to operate in a perfect manner as above stated.

Having thus described my invention, what I claim as new and desire to secure by Letters Patent, is—

The reciprocating corrugated or fluted board or rubber C, in combination with the rollers J, the rollers being attached to the chains I, I, the board or rubber and rollers being arranged and operating as shown and described for the purpose specified.

JACOB PURKEY.

Witnesses:
SAML. CROSS,
GEORGE M. SHETTER.